United States Patent
Alarawi et al.

(10) Patent No.: US 12,480,035 B2
(45) Date of Patent: Nov. 25, 2025

(54) COMPOSITIONS AND METHODS FOR UTILIZING GROUND CALCIUM CARBONATE FOR CONSOLIDATING CARBONATE ROCK FORMATION

(71) Applicant: Saudi Arabian Oil Company, Dhahran (SA)

(72) Inventors: Abeer Ateeq Alarawi, Al Khobar (SA); Murtadha J. AlTammar, Dhahran (SA); Jasim Rubeh, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/185,104

(22) Filed: Mar. 16, 2023

(65) Prior Publication Data
US 2024/0309264 A1   Sep. 19, 2024

(51) Int. Cl.
*C09K 8/57* (2006.01)
*E21B 43/26* (2006.01)
*E21B 43/16* (2006.01)

(52) U.S. Cl.
CPC ............. *C09K 8/572* (2013.01); *E21B 43/26* (2013.01); *E21B 43/16* (2013.01)

(58) Field of Classification Search
CPC .. C09K 8/572; C09K 8/80; C09K 8/58; E21B 43/26; E21B 43/16; C09C 1/021
See application file for complete search history.

(56) References Cited

U.S. PATENT DOCUMENTS

| | | | |
|---|---|---|---|
| 4,539,389 A * | 9/1985 | Kiriyama | G11B 5/73927 525/437 |
| 7,228,904 B2 | 6/2007 | Todd et al. | |
| 9,982,183 B2 | 5/2018 | Holdsworth et al. | |
| 11,492,494 B2 * | 11/2022 | Desouky | C09C 1/021 |
| 2014/0076572 A1 * | 3/2014 | Gadberry | E21B 43/27 166/308.4 |
| 2020/0063018 A1 * | 2/2020 | Kalgaonkar | C09K 8/516 |
| 2021/0246363 A1 * | 8/2021 | Al-Jawad | C09K 8/94 |
| 2021/0332285 A1 * | 10/2021 | May | C09K 8/514 |
| 2023/0357034 A1 * | 11/2023 | Battisti | C08L 75/04 |

FOREIGN PATENT DOCUMENTS

| WO | WO 2021/029845 | 2/2021 | |
|---|---|---|---|
| WO | WO-2021245144 A1 * | 12/2021 | B65D 65/466 |

OTHER PUBLICATIONS

Valentini F. et al. "Characterization of Calcium Carbonate Nanoparticles with Architectural Application for the Consolidation of Pietraforte" Analytical Letters, Taylor & Francis, May 11, 2021 (17 pages) (Year: 2021).*
Lee et al., "New Application of Rebound Hardness Numbers to Generate Logging of Unconfined Compressive Strength in Laminated Shale Formations," American Rock Mechanics Association, Jun. 2014, 7 pages.
Leeb "Dynamic hardness testing of metallic materials," NDT International, Dec. 1979, 12(6):123-128, 5 pages.
Li et al., "Forecasting Crude Oil Prices Using Ensemble Empirical Mode Decomposition and Sparse Bayesian Learning," Energies, Jul. 2018, 11(7), 1882:23 pages.
López-Arce et al., "Short- and Longer-Term Consolidation Effects of Portlandite $(CaOH)_2$ Nanoparticles in Carbonate Stones," Journal of Materials in Civil Engineering, Nov. 2013, 25:1655-1665, 11 pages.
Pinto et al., "Consolidation of carbonate stones: Influence of treatment procedures on the strengthening action of consolidants," Journal of Cultural Heritage, Jan. 2011, 13(2):154-166, 13 pages.
Zahm et al., "Characterization of Rock Strength in Cretaceous Strata along the Stuart City Trend, Texas," GCAGS Transactions, 2010, 60:693-702, 10 pages.
"Safety Data Sheet—Baracarb® 50," Halliburton, Jun. 22, 2015, 8 pages.

* cited by examiner

*Primary Examiner* — Silvana C Runyan
(74) *Attorney, Agent, or Firm* — Fish & Richardson P.C.

(57) ABSTRACT

A composition for consolidating a carbonate rock formation includes ground calcium carbonate (GCC) and a solvent. A method of consolidating a carbonate rock formation includes providing a consolidant composition comprising ground calcium carbonate (GCC) and a solvent, applying the consolidant composition to a rock formation, and allowing the GCC to precipitate onto the rock formation.

20 Claims, 6 Drawing Sheets

COMPOSITIONS AND METHODS FOR UTILIZING GROUND CALCIUM CARBONATE FOR CONSOLIDATING CARBONATE ROCK FORMATION

FIELD

The disclosure relates to compositions and methods that utilize ground calcium carbonate (GCC) for consolidating a carbonate rock formation.

BACKGROUND

Hydraulic fracturing processes utilized in the oil and gas industry enhance rock formation conductivity by injecting dense fluids at high pressures to generate a fracture and propagate deep into the formation. The fracturing methods can be classified into either proppant or acid fracturing methods. In the proppant fracturing method, sand or ceramic particles are injected with fluids to hold and preserve the fractures, while in the acid fracturing method, acid with highly reactive properties such as hydrochloric acid (HCl) is injected to etch the rock formation's surface and create asperities to prevent fracture closure under stress. The rock formation is under increased applied stresses during the hydrocarbons production, which combined with the elevated temperatures, leads to gradual plastic deformation of the reservoir rock that causes creep deformation. Consequently, several issues that reduce hydrocarbons production can happen, such as proppant embedment (indentation of proppant material into reservoir rock) and asperities failure. Therefore, a need exists to preserve and enhance the long-term fracture conductivity in carbonate rock formations.

SUMMARY

The disclosure relates to methods and compositions to enhance the mechanical characteristics of carbonate rock formations to reduce decline in fracture conductivity.

The disclosure provides a composition for consolidating a carbonate rock formation including ground calcium carbonate (GCC) and a solvent. In certain embodiments, the solvent is 1,4-butanediol.

In certain embodiments, the GCC has an average particle size of from 0.2 μm to 30 μm.

In certain embodiments, the composition includes from 1 g to 20 g of the GCC per 100 ml of the solvent.

In certain embodiments, the composition has a viscosity in a range of from 35 cP to 70 cP.

The disclosure further provides a method of consolidating a carbonate rock formation including providing a consolidant composition including ground calcium carbonate (GCC) and a solvent; applying the consolidant composition to a rock formation; and allowing the GCC to precipitate onto the rock formation.

In certain embodiments, the solvent is a $C_1$-$C_6$ alcohol solvent. In certain embodiments, the solvent is 1,4-butanediol.

In certain embodiments, the applying includes immersing the rock formation in the composition or injecting the composition into the rock formation.

In certain embodiments, the allowing the GCC to precipitate includes contacting the rock formation with the composition for a time between 3 days and 7 days. In certain embodiments, the applying the composition is performed at a temperature in a range of from 20° C. to 175° C.

In certain embodiments, the method further includes drying the rock formation at a temperature between 50° C. and 300° C. In certain embodiments, the drying is performed for a time between 1 hour and 24 hours.

In certain embodiments, the rock formation is a limestone-based formation.

In certain embodiments, the rock formation is an underground formation.

In certain embodiments, Young's modulus of the rock formation after the consolidation is higher than that of the rock formation prior to the consolidation. In certain embodiments, an Unconfined Compressive Strength (UCS) of the rock formation after the consolidation is higher than that of the rock formation prior to the consolidation. In certain embodiments, a Rebound Hardness Number (RHN) of the rock formation after the consolidation is higher than that of the rock formation prior to the consolidation. In certain embodiments, a dry weight, a bulk density, and/or a bulk volume of the rock formation after the consolidation is higher than that of the rock formation prior to the consolidation.

DETAILED DESCRIPTION

Unless otherwise defined, all technical and scientific terms used in this document have the same meaning as commonly understood by one of ordinary skill in the art to which the present application belongs.

As used in this disclosure, the term "ground calcium carbonate (GCC)" refers to the direct product of grinding limestone rock, limestone chalk, and/or marble rocks into a powder. GCC differs from precipitated calcium carbonate (PCC) in that PCC is chemically produced and precipitated out as powder.

Figure 1:
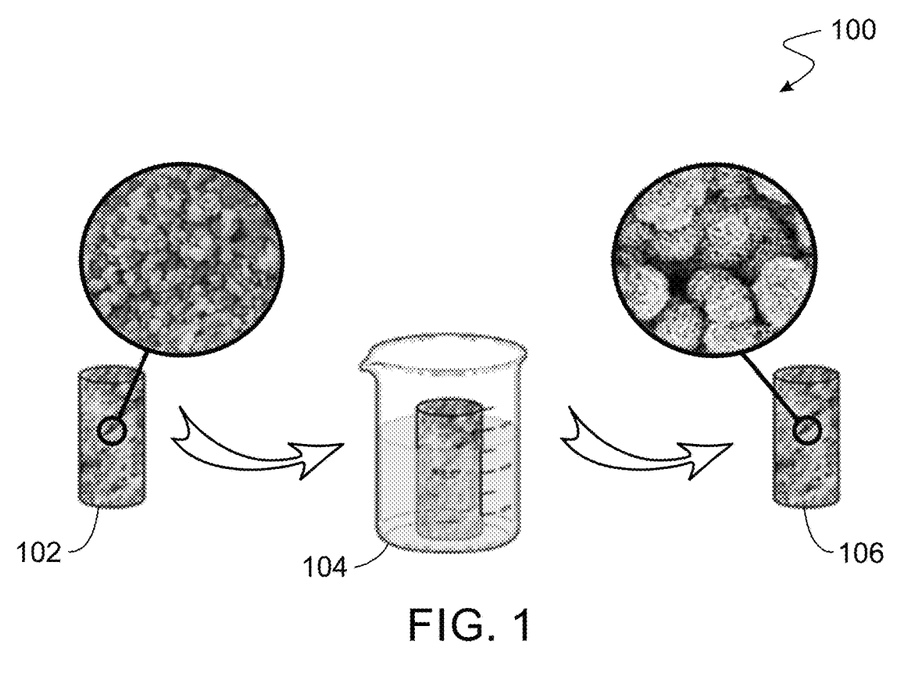
FIG. 1 depicts a dissolution-precipitation reaction.

Disclosed herein is a composition for consolidating a carbonate rock formation comprising ground calcium carbonate (GCC) and a solvent. Without wishing to be bound by theory, the consolidating mechanism is based on transforming calcium carbonate ($CaCO_3$) particles to bond with the individual rock grains through dissolution-precipitation reactions to alter the rock's mineralogy. FIG. 1 depicts an example dissolution-precipitation reaction 100 for consolidation of a rock formation 102. The rock formation 102 is immersed in consolidant composition 104 comprising GCC and a solvent. In dissolution, the GCC particles separate from each other and become surrounded by solvent molecules. In precipitation, the GCC particles react with free particles on the surface of the rock formation to form consolidated rock formation 106. As shown in FIG. 1, the GCC particles of the composition 104 bond with individual rock grains of the rock formation.

The solvent may be any suitable solvent that can dissolve GCC and has a suitable volatility and viscosity to allow for penetration into the rock formation. In some embodiments, the solvent is an alcohol solvent. In some embodiments, the solvent is a $C_1$-$C_6$ alcohol solvent. In some embodiments, the solvent comprises a primary alcohol. In some embodiments, the solvent comprises methanol, ethanol, n-propanol, n-butanol, isopropanol, isobutanol, butanediol, or combinations thereof. In some embodiments, the solvent comprises a diol. In some embodiments, the solvent comprises butanediol. In some embodiments, the solvent comprises 1,4-butanediol. In some embodiments, the solvent is non-aqueous. In some embodiments, the composition is free of acid. In some embodiments, the solvent is substantially free of ethanol and/or isopropanol. In some embodiments, the solvent has a low or minimal eco-toxicological impact in order to avoid damage to the rock formation. In some embodiments, the composition has no more than one solvent.

In some embodiments, the composition comprises from 0.5 g to 100 g of the GCC per one liter of the solvent. In some embodiments, the composition comprises from 0.5 g to 20 g of the GCC per 100 ml of the solvent. In some embodiments, the composition comprises from 1 to 50 g of the GCC per 100 ml of the solvent, from 1 g to 30 g of the GCC per 100 ml of the solvent, from 1 g to 20 g of the GCC per 100 ml of the solvent, from 2 g to 15 g of the GCC per 100 ml of the solvent, or from 10 g to 20 g per 100 ml of the solvent.

In some embodiments, the GCC has an average particle size of from 0.01 μm to 100 μm, such as from 0.1 μm to 50 μm, or from 0.2 μm to 30 μm. In some embodiments, the GCC has an average particle size of less than 100 μm, less than 50 μm, or less than 30 μm. In some embodiments, a smaller average particle size increases the surface area of the GCC per unit volume and leads to improved reactivity with the rock formation and improved penetration through the porous matrices of the rock formation. In some embodiments, the GCC is a white powder. In some embodiments, the GCC has a specific gravity of about 2.7 units. In some embodiments, the GCC has a solubility in 15% HCl of at least about 96%.

In some embodiments, the composition has a viscosity in a range of from 25 cP to 100 cP, as measured by a viscometer. In some embodiments, the composition has a viscosity in a range of from 35 cP to 70 cP. In some embodiments, the composition has a viscosity low enough to penetrate deep inside the porous network of the rock formation. In some embodiments, the composition has a viscosity of less than 100 cP. In some embodiments, the composition has a viscosity of less than 70 cP.

In some embodiments, the consolidant composition is substantially free of silicates, resins, $SiO_2$ nanoparticles, $Ca(OH)_2$ nanoparticles, calcium chloride, amines, diammonium hydrogen phosphate, silicon-based products, and/or alkaline-earth metal hydroxides.

Figure 2:
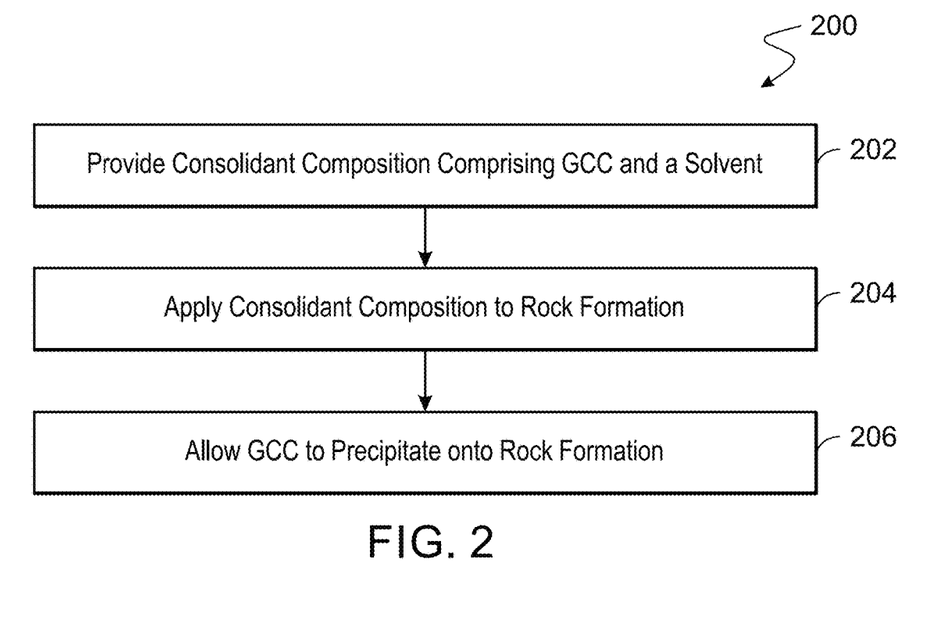
FIG. 2 is a flowchart depicting an example method.

FIG. 2 depicts a flowchart 200 for a method of consolidating a carbonate rock formation. In step 202, a composition comprising ground calcium carbonate (GCC) and a solvent is provided. In step 204, the consolidant composition is applied to a rock formation. In step 206, the GCC is allowed to precipitate onto the rock formation.

The application of the composition can be performed in any suitable manner that provides contact of the composition with the rock formation. In some embodiments, applying the composition comprises immersing a rock formation in the composition or injecting the composition into a rock formation. In some embodiments, the rock formation is immersed in the composition. In some embodiments, the composition is injected into a rock formation, such as an underground formation, e.g. a reservoir.

In some embodiments, the applying the composition is performed at a temperature in a range of from 20° C. to 175° C., such as from 20° C. to 150° C., or from 20° C. to 100° C.

The allowing the GCC to precipitate can be carried out by keeping the rock formation in contact with the composition for a suitable period of time. In some embodiments, the allowing the GCC to precipitate includes contacting the rock formation with the composition for a time between 1 day and 10 days, such as a time between 3 days to 7 days, between 4 days and 5 days, or for 4 days.

In some embodiments, after keeping the composition in contact with the rock formation for a suitable period of time, the composition is allowed to flow back out of the rock formation.

In some embodiments, the method further comprises drying the rock formation at an elevated temperature. In some embodiments, the method comprises drying the rock formation at a temperature between 50° C. and 300° C., such as between 50° C. and 200° C., between 50° C. and 175° C., 50° C. and 150° C., 50° C. and 125° C., or between 60° C. and 100° C. For example, in a reservoir, the drying temperature can be about 175° C. In some embodiments, the drying is performed for a time between 1 hour and 24 hours, such as a time between 2 hours and 12 hours, or between 5 hours and 10 hours.

In some embodiments, the temperature of the rock formation, e.g. a reservoir, is suitable for completing the dissolution-precipitation reaction without further drying the rock formation at an elevated temperature.

In some embodiments, the GCC is precipitated onto a surface of the rock formation. In some embodiments, the GCC is precipitated onto outer surfaces and inner surfaces of the rock formation.

In some embodiments, the carbonate rock formation is a limestone-based formation. In some embodiments, the carbonate rock formation is an underground formation. In some embodiments, the carbonate rock formation is a reservoir.

In some embodiments, the rock formation has enhanced mechanical properties after treatment with the consolidant composition.

In some embodiments, the rock formation has an increase in Young's modulus after the consolidation compared to a Young's modulus of the rock formation prior to the consolidation. The Young's modulus, also called an elastic modulus, is a parameter to describe the stress and strain relationship of the rock formation.

In some embodiments, the rock formation has an increase in Unconfined Compressive Strength (UCS) after the consolidation compared to a UCS of the rock formation prior to the consolidation. Unconfined Compressive Strength (UCS) refers to the maximum axial compressive stress that a rock formation can bear under zero confining stress.

In some embodiments, the rock formation has an increase in Rebound Hardness Number (RHN) after the consolidation compared to a RHN of the rock formation prior to the consolidation. Rebound Hardness Number (RHN) is a parameter for testing rock hardness.

In some embodiments, the rock formation has an increase in dry weight after the consolidation compared to a dry weight of the rock formation prior to the consolidation. In some embodiments, the rock formation has an increase in bulk density after the consolidation compared to a bulk density of the rock formation prior to the consolidation. In some embodiments, the rock formation has an increase in bulk volume after the consolidation compared to a bulk volume of the rock formation prior to the consolidation.

The consolidant composition disclosed herein has advantages over other consolidant compositions because the composition disclosed herein permits compatibility with the rock formation and allows for the formation of $CaCO_3$ crystals on the outer and inner surfaces of the rock formation. Without wishing to be bound by theory, because the GCC-based composition has the same mineral product as the carbonate rock formation it is applied to, it can mimic the natural process responsible for calcerous stone formation.

Further advantages of the compositions and methods disclosed herein include sustainable and environmentally benign properties, consolidation of the stone with no pore plugging, ready availability and low cost of GCC, and fewer additives.

The consolidant composition disclosed herein can reduce fracture conductivity decline resulting from issues such as proppant embedment and asperities failure in hydraulic/acid fractures and aging well due to softening of the rock formation.

EXAMPLES

Examples 1-5: Consolidant Compositions

Three consolidant compositions including GCC powder and 1,4-butanediol ($C_4H_{10}O_2$) were prepared at the concentrations shown in Table 1.

TABLE 1

| Example | GCC concentration (grams GCC in 100 ml 1,4-butanediol) |
|---|---|
| 1 | 2.5 |
| 2 | 7.5 |
| 3 | 15 |
| 4 | 10 |
| 5 | 20 |

Rock Sample Preparation

Limestone mother core samples were cut to small discs with a diameter of 0.35×1.5×1 inch.

Rock Sample Pretreatment Characterizations

The assessment of consolidation effectiveness is not straightforward; however, an aim of a consolidation process is to enhance the cohesion and adhesion of stone constituents. Therefore, parameters were examined that directly or indirectly characterize this cohesion and adhesion.

Several characterization experiments were conducted to elucidate the rock's physical, morphological, and mechanical characteristics, including XRD, porosity, permeability, and hardness tests.

According to X-ray Diffraction (XRD) analysis, the core is a limestone containing 98.8 wt % sedimentary Calcite [$CaCO_3$] and 1.2 wt % Quartz [$SiO_2$]. The fossilized shells are also visible from optical observation. Table 2 demonstrates the physical properties of the mother core sample. Bulk density of the material was calculated using the following formula: D=M/V; wherein D is bulk density (g/L), M is dry weight of the sample (g), and V is volume of the sample (L). Bulk density is an indicator of matter compaction. Bulk volume includes the volume of matter particles and the volume of pores among matter particles.

TABLE 2

Mother core sample properties before treatment

| | Length [cm] | Diameter [cm] | Dry Weight [g] | Bulk Density [g/ml] | Bulk Volume [g/cc] | Porosity % | Permeability air (mD) |
|---|---|---|---|---|---|---|---|
| Core 1 | 7.6 | 3.814 | 190.8 | 87.191 | 2.19 | 18.28 | 39.71 |

Example 6: Treatment of a Rock Sample with Consolidant Composition

The disc samples were immersed in the GCC-based composition of Example 1 for four days. Then, they were dried in the oven at 80° C. for 8 hours. Tables 3 and 4 summarize the physical and mechanical properties of the samples before and after treatments. The increase in the dry-weight, bulk density, and bulk volume of the treated sample with the composition of Example 1 reflects the success of the precipitation reaction and the penetration of GCC particles to the bulk of the disc sample.

TABLE 3

Disc properties before and after treatment with the composition of Example 1

| | Length [cm] | Diameter [cm] | Dry Weight [g] | Bulk Density [g/ml] | Bulk Volume [g/cc] | Porosity % | Permeability air (mD) |
|---|---|---|---|---|---|---|---|
| Before treatment | 0.914 | 3.81 | 21.78 | 2.166 | 2.149 | 18.808 | 35.080 |
| After treatment | 0.914 | 3.81 | 22.106 | 2.178 | 2.181 | 18.607 | 32.513 |

TABLE 4

Disc mechanical properties before and after treatment with the composition of Example 1

| Measurement # | 1 | 2 | 3 | 4 | 5 | 6 | 7 |
|---|---|---|---|---|---|---|---|
| *Untreated Sample* | | | | | | | |
| HN | 158 | 215 | 226 | 185 | 216 | 203 | 175 |
| RHN-Corr | 90 | 147 | 158 | 117 | 148 | 135 | 107 |
| E, psi | 7.19E+05 | 8.73E+05 | 9.06E+05 | 7.88E+05 | 8.76E+05 | 8.38E+05 | 7.62E+05 |
| UCS, psi | 524.4 | 729.9 | 778.0 | 613.3 | 734.2 | 680.8 | 578.8 |
| *Treated Sample (First Measurement, A)* | | | | | | | |
| RHN | 203 | 142 | 129 | 154 | 132 | 197 | 237 |
| RHN-Corr | 135 | 74 | 61 | 86 | 64 | 129 | 169 |
| E, psi | 8.38E+05 | 6.81E+05 | 6.51E+05 | 7.09E+05 | 6.58E+05 | 8.21E+05 | 9.41E+05 |
| UCS, psi | 680.8 | 478.0 | 443.2 | 512.4 | 451.0 | 657.6 | 829.3 |
| *Treated Sample (Second Measurement, B)* | | | | | | | |
| RHN | 225 | 194 | 151 | 193 | 137 | 244 | 209 |
| RHN-Corr | 157 | 126 | 83 | 125 | 69 | 176 | 141 |
| E, psi | 9.03E+05 | 8.13E+05 | 7.02E+05 | 8.10E+05 | 6.69E+05 | 9.63E+05 | 8.55E+05 |
| UCS, psi | 773.5 | 646.2 | 503.6 | 642.5 | 464.3 | 863.6 | 704.9 |

| Measurement # | 8 | 9 | 10 | 11 | Min | Max | Average |
|---|---|---|---|---|---|---|---|
| *Untreated Sample* | | | | | | | |
| HN | 192 | 146 | 171 | 198 | 146 | 226 | 190 |
| RHN-Corr | 124 | 78 | 103 | 130 | 78 | 158 | 122 |
| E, psi | 8.07E+06 | 6.90E+05 | 7.52E+05 | 8.24E+05 | 6.90E+05 | 9.06E+05 | 8.03E+05 |
| UCS, psi | 638.8 | 489.2 | 565.5 | 661.4 | 489 | 778 | 636 |
| *Treated Sample (First Measurement, A)* | | | | | | | |
| RHN | 346 | 128 | 140 | 272 | 128 | 346 | 189 |
| RHN-Corr | 278 | 60 | 72 | 204 | 60 | 278 | 121 |
| E, psi | 1.36E+06 | 6.49E+05 | 6.76E+05 | 1.06E+06 | 6.49E+05 | 1.36E+06 | 8.22E+05 |
| UCS, psi | 1560.4 | 440.7 | 472.4 | 1015.9 | 441 | 1560 | 686 |
| *Treated Sample (Second Measurement, B)* | | | | | | | |
| RHN | 162 | 130 | 201 | 208 | 130 | 244 | 187 |
| RHN-Corr | 94 | 62 | 133 | 140 | 62 | 176 | 119 |
| E, psi | 7.29E+05 | 6.54E+05 | 8.32E+05 | 8.52E+05 | 6.54E+05 | 9.63E+05 | 7.98E+05 |
| UCS, psi | 536.7 | 445.8 | 673.0 | 700.9 | 446 | 864 | 632 |

In Table 4, each column 1-11 is a discrete rebound hammer measurement on the disc, wherein each measurement 1-11 measures a different part of the disc. RHN refers to Rebound Hardness Number; RHN-Corr. Refers to Corrected RHN; E refers to Static Young's modulus (psi); and UCS refers to Unconfined Compressive Strength (psi). Each treated sample was measured twice where the time difference between the two samples is one week. A First measurement (Measurement A) was measured once the sample dried. A Second measurement (Measurement B) was measured one week after treatment.

Several empirical relationships were established between rebound hardness measurements and various rock mechanics parameters from the results shown in Table 4. These relationships were determined in pretreatment samples before and after the treatment process. Namely, unconfined compressive strength and Young's modulus were found to have exponential correlation with rebound hardness number (e.g., Lee, J. S., Smallwood, L., & Morgan, E. (2014). New Application of Rebound Hardness Numbers to Generate Logging of Unconfined Compressive Strength in Laminated Shale Formations; Zahm. C. K, Enderlin. M. (2010). Characterization of rock strength in Cretaceous strata along the Stuart City Trend, Texas. GCAGS Transac. 60 (2010), pp. 693-702; Li, T., Hu, Z., Jia, Y., Wu, J., & Zhou, Y. (2018). Forecasting crude oil prices using ensemble empirical mode decomposition and sparse Bayesian learning. Energies, 11(7), 1882).

Recommended Empirical Relationships are listed below:

Unconfined compressive strength $(UCS) =$ $$2.1454 \times e^{0.0058 RHN} \times 145.038 \text{ [psi]}$$

Static Young's modulus $(E) = 529470 \times e^{0.0034 RHN}$ [psi]

Correction for ⅓ Part Measurements

Corrected $RHN = RHN$ on 1/3 part $+/-$ deviation from calibration block

Figure 3:
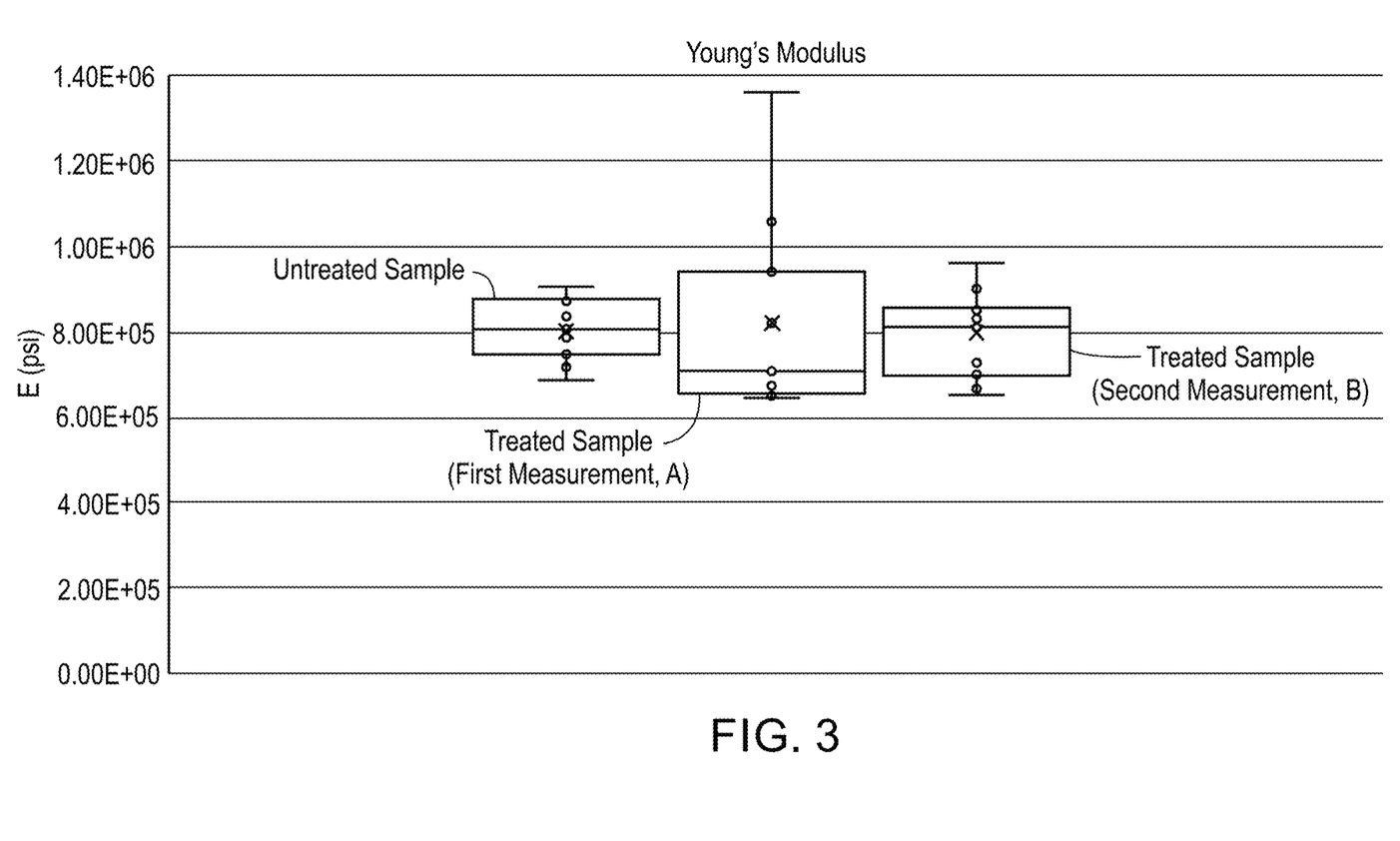
FIG. 3 is a graph showing Young's modulus (E) of a rock sample before and after treatment with the composition of Example 1.

FIG. 3 shows the Young's Modulus (E) of the disc before and after treatment with the composition of Example 1. Treated Sample (First Measurement, A) was measured once the sample had dried. Treated Sample (Second Measurement, B) was measured one week after treatment.

Figure 4:
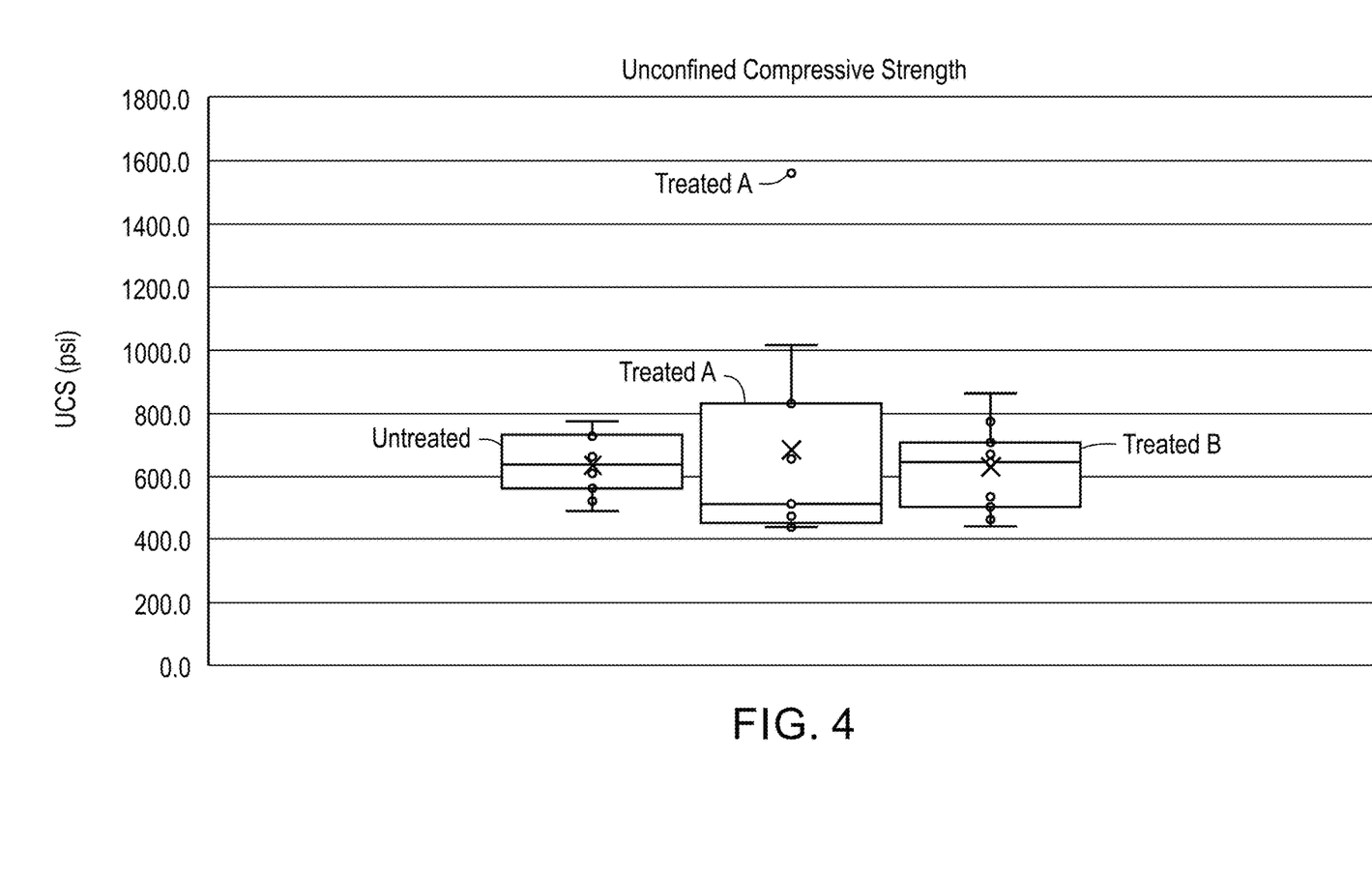
FIG. 4 is a graph showing Unconfined Compressive Strength (UCS) of a rock sample before and after treatment with the composition of Example 1.

FIG. 4 shows the Unconfined Compressive Strength (UCS) of the disc before and after treatment with the composition of Example 1. Treated A was measured once the sample had dried. Treated B was measured one week after treatment.

Figure 5:
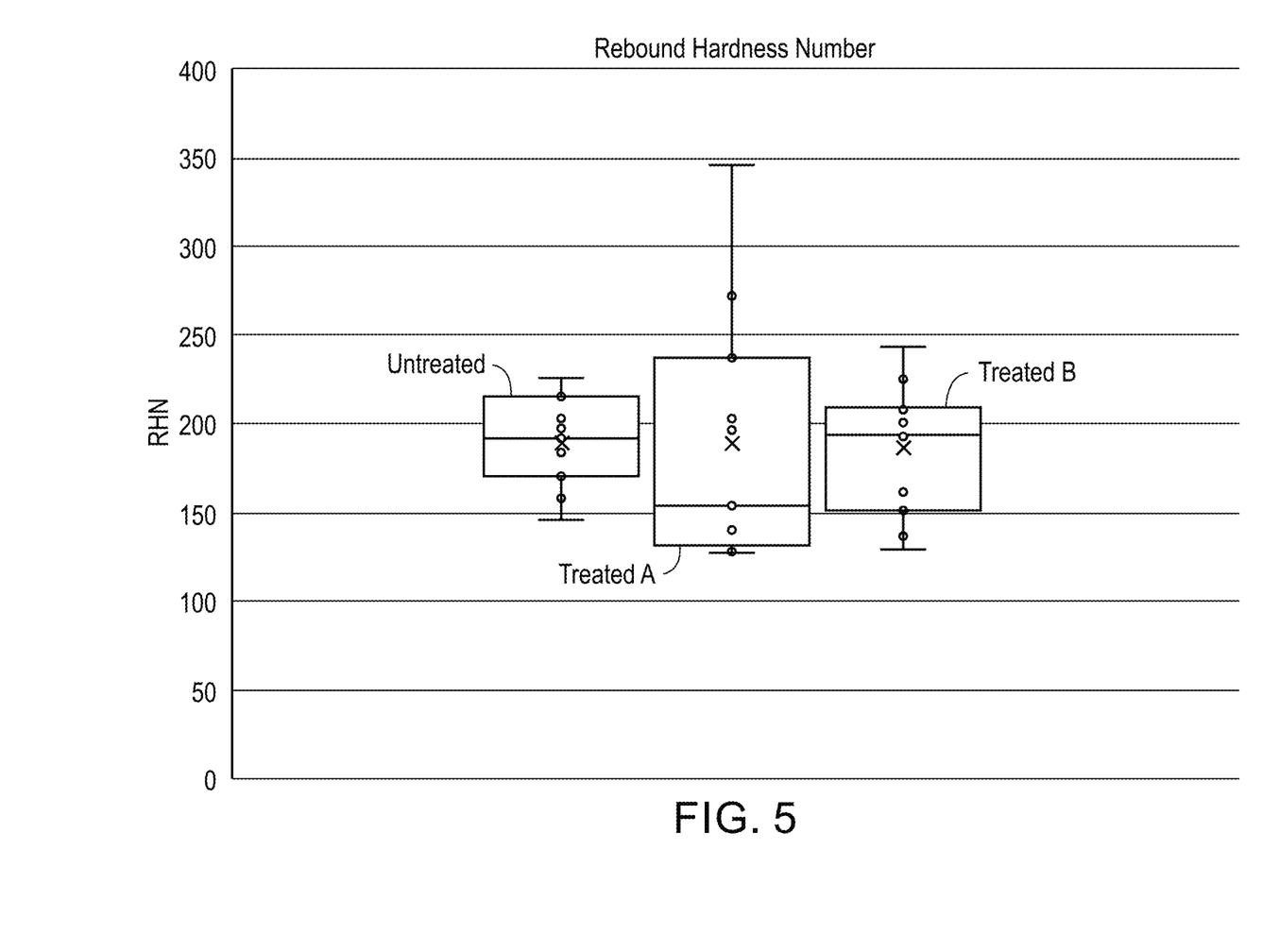
FIG. 5 is a graph showing the Rebound Hardness Number (RHN) of a rock sample before and after treatment with the composition of Example 1.

FIG. 5 shows the Rebound Hardness Number of the disc before and after treatment with the composition of Example 1. Treated A was measured once the sample had dried. Treated B was measured one week after treatment. A micro-rebound tester type D (Piccollo 2) was used for core-based high-resolution non-destructive mechanical characterization. The micro-rebound tester is a hand-held portable instrument that directly measures rock hardness based on the Leeb rebound principle (D. H. Leeb, New dynamic method for Hardness testing of metallic materials, VDI-Report No. 308, pp. 123-128, 1978). The micro-rebound tester launches an impact body with a tungsten carbide testing tip by spring energy against the sample and rebounds freely in the guide tube. A permanent magnet inside the impact body passes through a coil, in which a voltage is induced during impact body launch and rebound. The induced signals are proportional to the initial and rebound velocities. The device calculates the rebound hardness based on the ratio between initial velocity and rebound velocity after a low impact with the core sample.

$$\text{Rebound Hardness } (HLD) = V \text{ initial}/V \text{ rebound} \times 100$$

The device measurement ranges between 150 HLD and 950 HLD for rebound hardness. It can also be connected to a computer for real-time monitoring and quality checking of the data. The device memory can store up to 2500 rebound measurements. If the testing angle was not perfectly vertical the device can automatically compensate for the gravity component. The rebound hardness measurements are reproducible and can be empirically related to several rock mechanical properties (primarily unconfined compressive strength and Young's Modulus).

Although the average values of rebound hammer number, Young's modulus, and UCS are quite similar for the untreated and treated samples (see Table 4, FIGS. 3-5), the results clearly show specific measurements where the treated samples have higher values compared to the untreated samples.

Example 7: Treatment of Rock Samples with Consolidant Compositions

Disc samples were immersed in the GCC-based compositions of Example 4 or Example 5 for four days. Then, they were dried in the oven at 80° C. for 8 hours.

Figure 6:
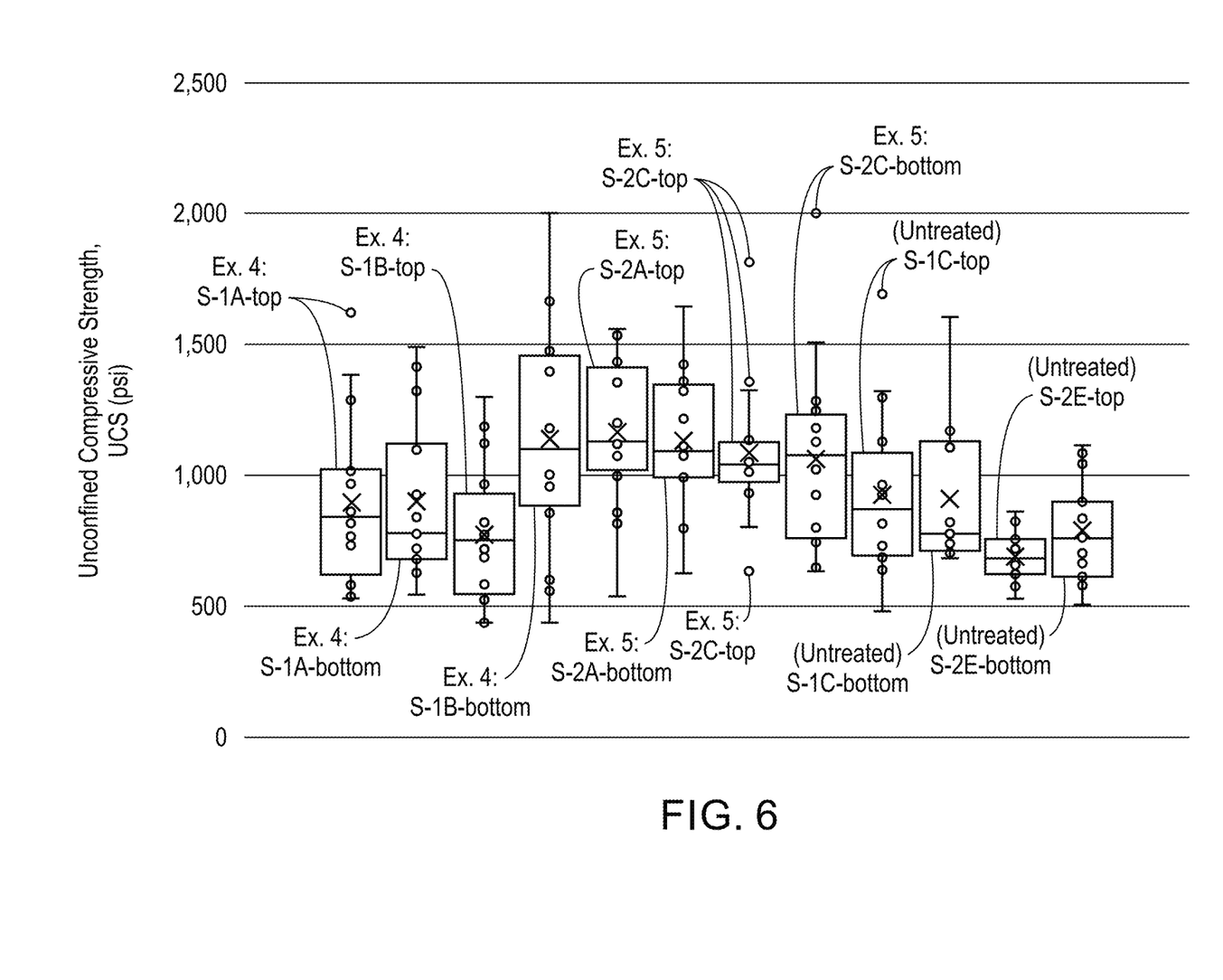
FIG. 6 is a graph showing the Unconfined Compressive Strength (UCS) of rock samples treated with the compositions of Examples 4 and 5, as well as untreated rock samples.
Figure 7:
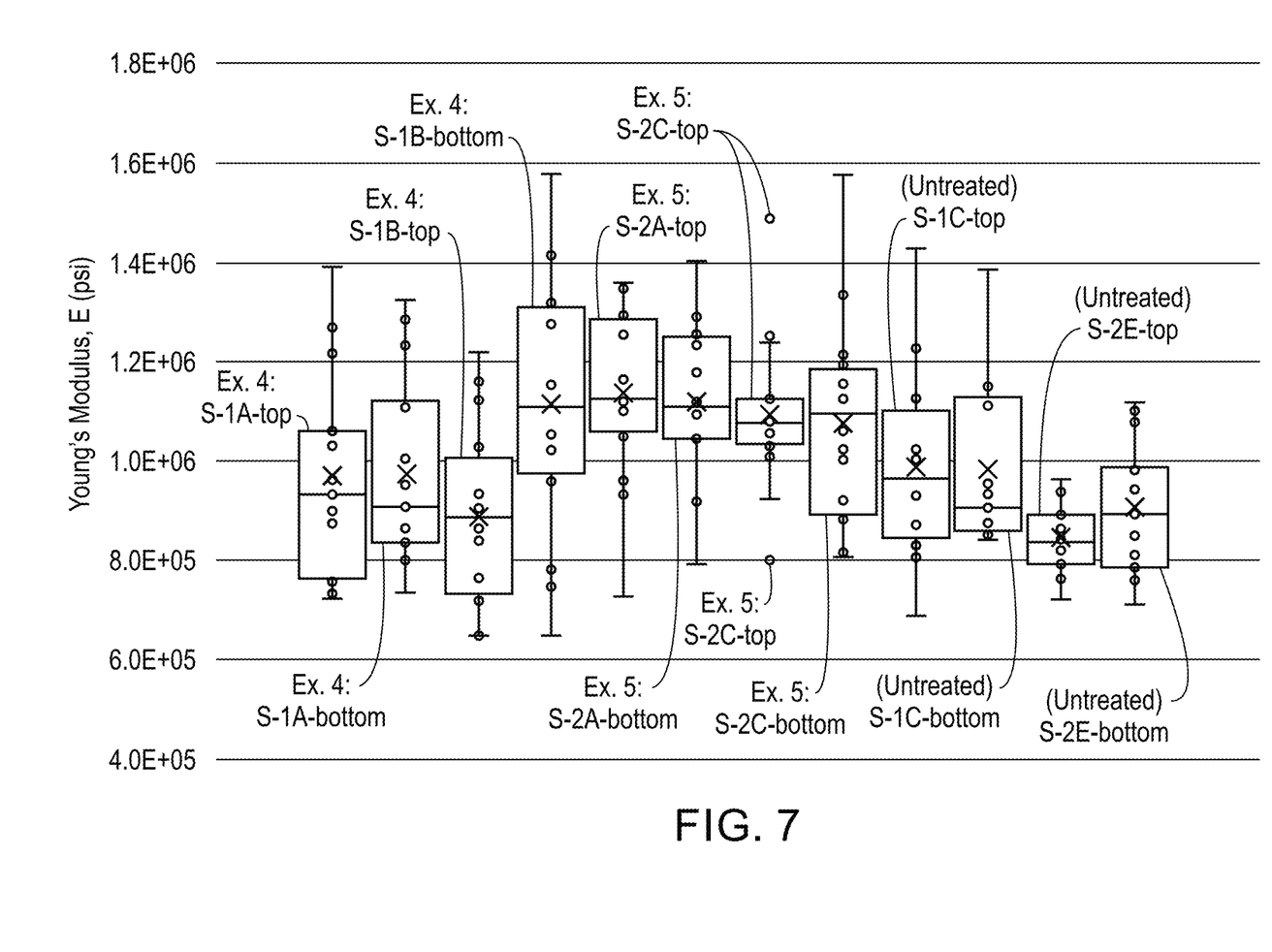
FIG. 7 is a graph showing Rebound Hardness Number (RHN) of rock samples treated with the compositions of Examples 4 and 5, as well as untreated rock samples.

The UCS and Young's modulus (E) values of untreated samples and samples treated with the compositions of Examples 4 and 5 are shown in FIGS. 6 and 7, respectively. Table 5 summarizes the mechanical properties of untreated discs and treated discs. Four samples each are shown for the discs treated with Example 4, the discs treated with Example 5, and the untreated discs.

TABLE 5

Disc mechanical properties for samples treated with the compositions of Example 4 and Example 5, and untreated samples

| Example and Sample # | Side of disc sample | Corrected RHN | UCS (psi) | E (psi) | Average UCS (psi) | Average E (psi) |
| --- | --- | --- | --- | --- | --- | --- |
| Ex. 4: S1A | Top | 172.53 | 896.82 | 9.71E+05 | 925.79 | 9.87E+05 |
| Ex. 4: S1A | Bottom | 174.69 | 898.74 | 9.74E+05 | | |
| Ex. 4: S1B | Top | 146.69 | 767.81 | 8.88E+05 | | |
| Ex. 4: S1B | Bottom | 210.94 | 1139.78 | 1.11E+06 | | |
| Ex. 5: S2A | Top | 221.75 | 1163.51 | 1.14E+06 | 1,110.53 | 1.11E+06 |
| Ex. 5: S2A | Bottom | 217.56 | 1129.96 | 1.12E+06 | | |
| Ex. 5: S2C | Top | 211.06 | 1084.84 | 1.09E+06 | | |
| Ex. 5: S2C | Bottom | 203.56 | 1063.80 | 1.08E+06 | | |
| (Untreated)-S1C | Top | 178.94 | 922.38 | 9.89E+05 | 827.74 | 9.31E+05 |
| (Untreated)-S1C | Bottom | 178.93 | 909.23 | 9.84E+05 | | |
| (Untreated)-S2E | Top | 136.38 | 692.55 | 8.44E+05 | | |
| (Untreated)-S2E | Bottom | 155.13 | 786.81 | 9.06E+05 | | |

The untreated samples demonstrated an average UCS of 827.74 psi and E of 9.31E+05 psi. In contrast, treating the samples with the composition of Example 4 increased the discs' strength to reach a UCS average of 925.79 psi and E of 9.87E+05 psi. In addition, treating the samples with the composition of Example 5, which had an increased GCC, enhanced the discs' strength by 34% based on UCS, providing an average UCS of 1,110.53 psi, as well as an enhanced E of 1.11E+06 psi.

What is claimed is:

1. A composition for consolidating a carbonate rock formation comprising:
    ground calcium carbonate (GCC), wherein the ground calcium carbonate has an average particle size of from 0.2 µm to 30 µm; and
    1,4-butanediol; wherein the composition comprises from 10 g to 20 g of the GCC per 100 ml of the 1,4-butanediol,
    wherein the composition is substantially free of silicates;
    the composition is substantially free of Ca(OH)2 nanoparticles; and
    the composition is free of acid.
2. The composition of claim 1, wherein the composition consists of the ground calcium carbonate and the 1,4-butanediol.
3. The composition of claim 1, wherein the composition has a viscosity in a range of from 35 cP to 70 cP.
4. The composition of claim 1, wherein the ground calcium carbonate comprises ground limestone rock, ground limestone chalk, ground marble rock, or a combination thereof.
5. A method of consolidating a carbonate rock formation comprising:
    providing a consolidant composition comprising ground calcium carbonate (GCC) and 1,4-butanediol, wherein the ground calcium carbonate has an average particle size of from 0.2 µm to 30 µm, and wherein the composition comprises from 10 g to 20 g of the ground calcium carbonate per 100 ml of the 1,4-butanediol; and
    applying the consolidant composition to a rock formation;

wherein the ground calcium carbonate precipitates onto the rock formation;

wherein the composition is substantially free of silicates;

the composition is substantially free of $Ca(OH)_2$ nanoparticles; and the composition is free of acid.

6. The method of claim 5, wherein the ground calcium carbonate precipitates onto the rock formation by a dissolution-precipitation reaction.

7. The method of claim 5, wherein the applying comprises immersing the rock formation in the composition or injecting the composition into the rock formation.

8. The method of claim 5, further comprising contacting the rock formation with the composition for a time between 3 days and 7 days.

9. The method of claim 5, wherein the applying the composition is performed at a temperature in a range of from 20° C. to 175° C.

10. The method of claim 5, further comprising drying the rock formation at a temperature between 50° C. and 300° C.

11. The method of claim 10, wherein the drying is performed for a time between 1 hour and 24 hours.

12. The method of claim 5, wherein the rock formation is a limestone-based formation.

13. The method of claim 5, wherein the rock formation is an underground formation.

14. The method of claim 5, wherein a Young's modulus of the consolidated carbonate rock formation is higher than that of the rock formation prior to consolidation.

15. The method of claim 5, wherein an Unconfined Compressive Strength (UCS) of the consolidated carbonate rock formation is higher than that of the rock formation prior to consolidation.

16. The method of claim 5, wherein a Rebound Hardness Number (RHN) of the consolidated carbonate rock formation is higher than that of the rock formation prior to consolidation.

17. The method of claim 5, wherein one or more of a dry weight, a bulk density, and a bulk volume of the consolidated carbonate rock formation is higher than that of the rock formation prior to consolidation.

18. The method of claim 5, wherein $CaCO_3$ crystals form on the outer and inner surfaces of the rock formation.

19. The method of claim 5, wherein the rock formation comprises calcium carbonate.

20. The method of claim 5, wherein the ground calcium carbonate comprises ground limestone rock, ground limestone chalk, ground marble rock, or a combination thereof.

* * * * *